United States Patent [19]
Wagner

[11] 3,910,426
[45] Oct. 7, 1975

[54] LOADING AND UNLOADING APPARATUS FOR SHEAVE FABRICATING MACHINE

[75] Inventor: John R. Wagner, Muncie, Ind.

[73] Assignee: Arrowhead Engineering Corporation, Knox, Ind.

[22] Filed: July 12, 1973

[21] Appl. No.: 378,646

[52] U.S. Cl.............................. 214/8.5 D; 214/1 BT
[51] Int. Cl............................................. B65g 59/04
[58] Field of Search .... 214/6 FS, 6 H, 8.5 R, 8.5 A, 214/8.5 D, 8.5 C, 1.1–1.5, 1 F, 1 BT, 1 BB, 1 R

[56] References Cited
UNITED STATES PATENTS

| | | | |
|---|---|---|---|
| 2,819,805 | 1/1958 | Vieth | 214/6 FS X |
| 3,527,365 | 9/1970 | Leonard | 214/1.3 |

FOREIGN PATENTS OR APPLICATIONS

| | | | |
|---|---|---|---|
| 246,174 | 10/1960 | Australia | 214/1 BT |

Primary Examiner—Frank E. Werner
Attorney, Agent, or Firm—Marmaduke Hobbs

[57] ABSTRACT

A loading and unloading apparatus for use with a sheave fabricating machine having a spindle mechanism for rotating a disc shaped blank, in which a turret means is used to place a stack of blanks in position for delivery to the spindle mechanism and a feeding mechanism having a head thereon with a magnet is adapted to carry a blank from the stack to the spindle mechanism and to remove a sheave from the spindle mechanism and discharge it from the machine. The turret mechanism has a plurality of stations, permitting one station to be loaded while the blanks of another station are being fed into the spindle machine. A mechanism is included for lifting the stack of blanks at the feeding position to place the uppermost blank in position for being carried into the machine.

6 Claims, 16 Drawing Figures

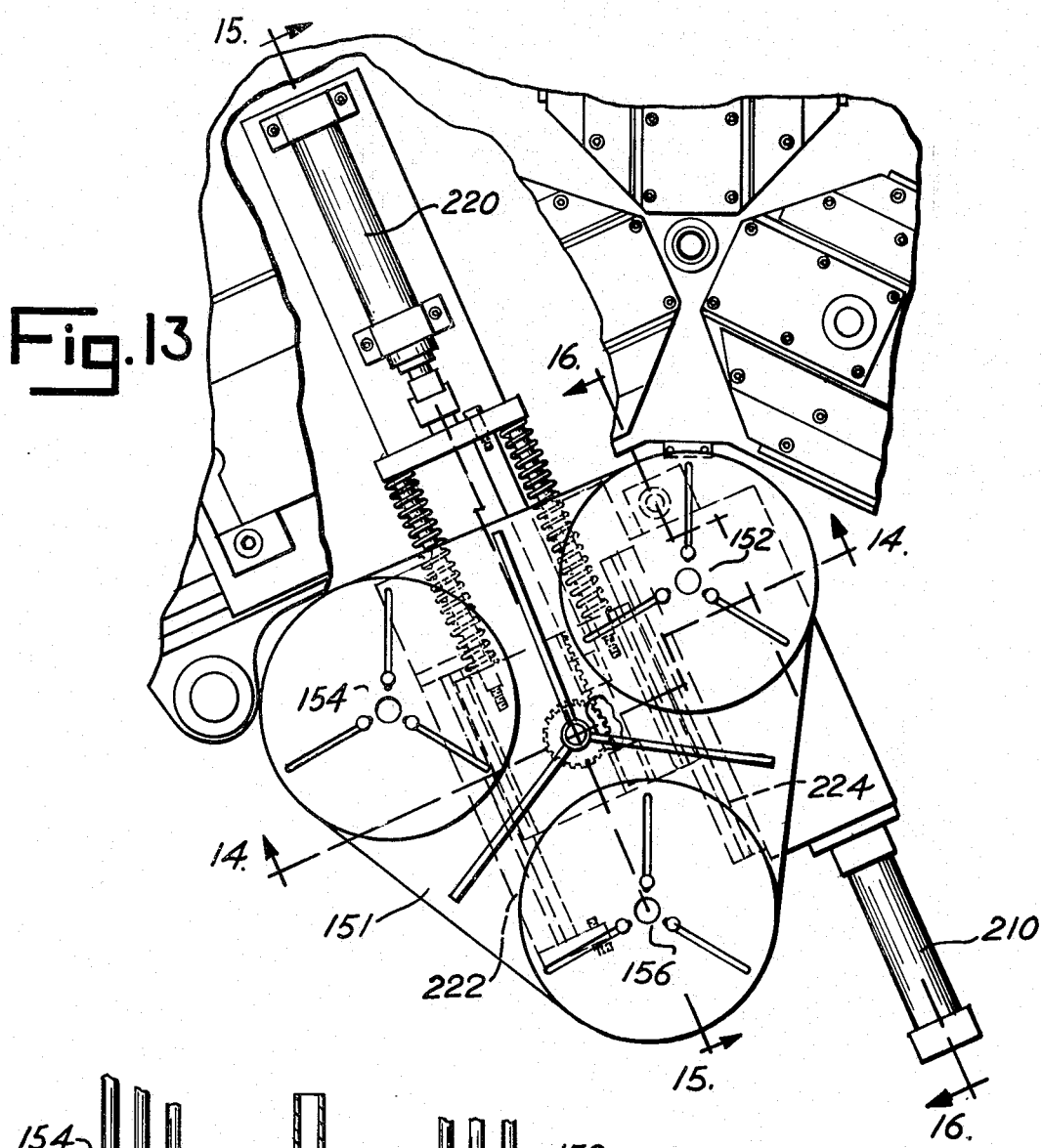
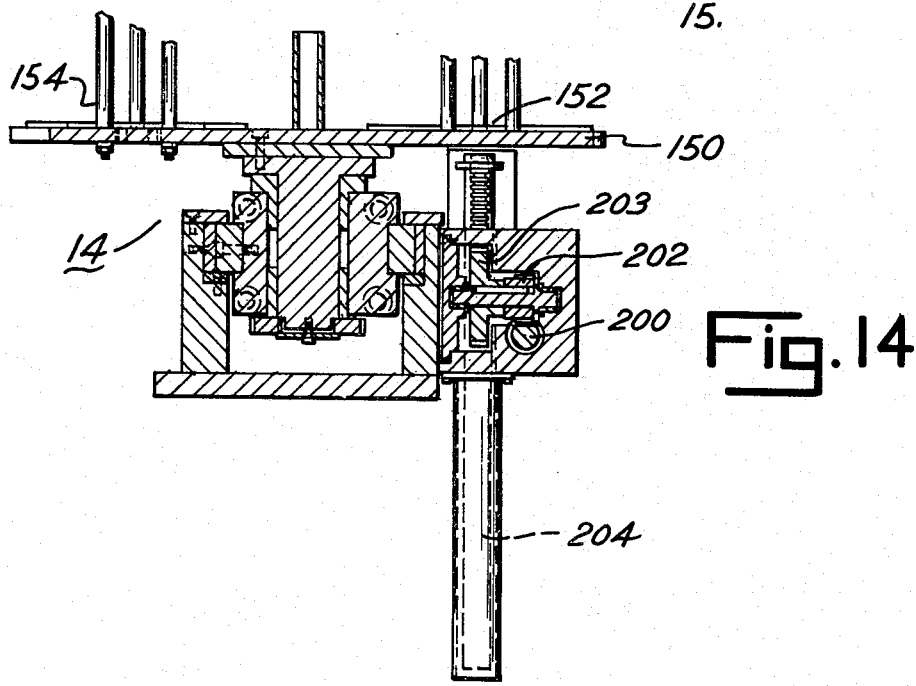

LOADING AND UNLOADING APPARATUS FOR SHEAVE FABRICATING MACHINE

Sheaves, pulleys and similar wheels have been fabricated commercially by a method and machine in which the periphery of a disc shaped blank is split to form two laterally extending flanges, and these flanges are shaped to the desired configuration for a particular shape or type of belt. A hub is either formed as an integral part of the blank or made as a separate part and secured in place after the flanges and belt groove have been formed in the periphery. The prior machines for producing these products have frequently been difficult to set up, control and service, and, unless these operations were done precisely, an appreciable amount of scrap has been produced, and/or the machine have been slow in production and often have required a substantial amount of downtime. Further, the slitting and forming tools required frequent servicing and replacement, and the machines required almost constant attention by an operator to keep the machines in continuous production. It is therefore one of the principal objects of the present invention to provide a loading and unloading apparatus for a machine for producing sheaves and similar grooved wheels, which can be quickly set up for producing one of a number of sheave sizes and thereafter operated over extended periods of time with little attention or servicing and which reduces the operator's time in loading, running and servicing the apparatus.

Another object of the invention is to provide a machine for producing pulleys and sheaves of the aforesaid type which will automatically feed the blanks into the machine, performing the slitting, spreading and reforming operation, and ejecting the finished pulley or sheave, and which will operate to perform the foregoing steps with little or no attention from the operator throughout the complete sequence of operation.

A further object is to provide an apparatus for use with a machine of the aforementioned type, which can easily and readily be set up for feeding blanks for producing pulleys or sheaves, and which can easily be changed to feed blanks for pulleys or sheaves of different size and shape, without disassembling any major part of the machine and without involving any substantial down-time.

Additional objects and advantages of the invention will become apparent from the following description and accompanying drawings, wherein:

FIG. 13 is a top plan view of the principal part of the loading mechanism;

FIG. 14 is a vertical cross sectional view of the loading mechanism, the section being taken on line 14 — 14 of FIG. 13;

Figure 1:
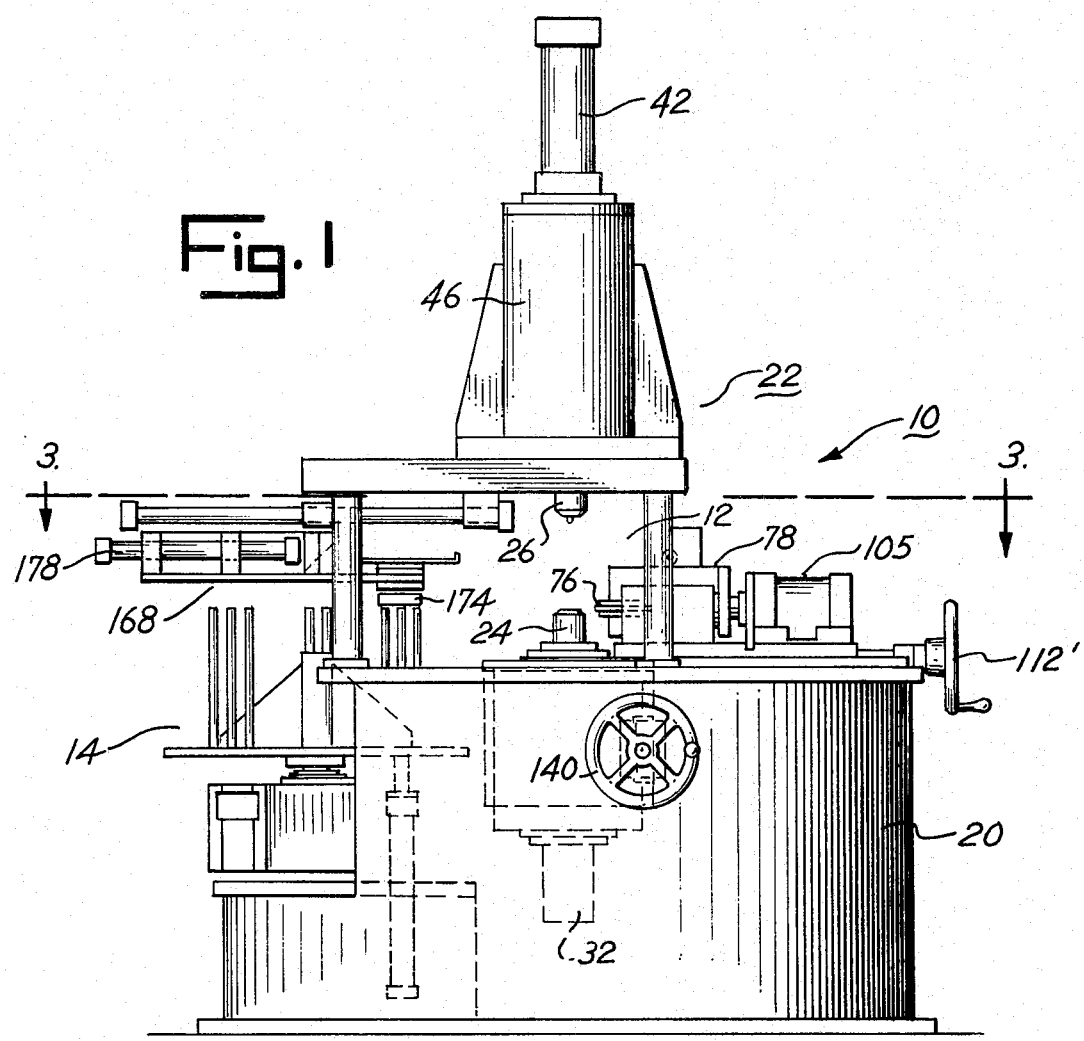
FIG. 1 is an elevational view of the sheave fabricating machine on which the present loading and unloading apparatus is used.
Figure 2:
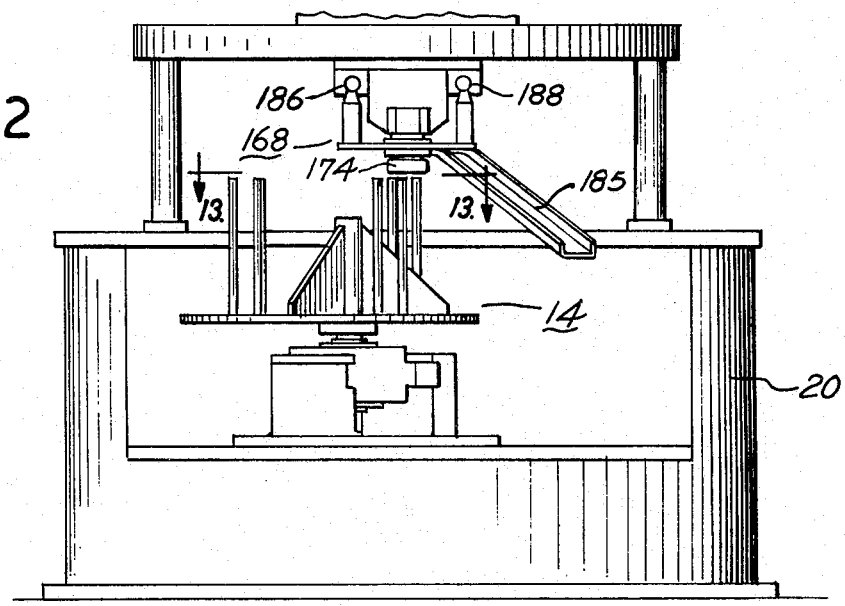
FIG. 2 is a fragmentary side elevational view of the machine shown in FIG. 1.
Figure 3:
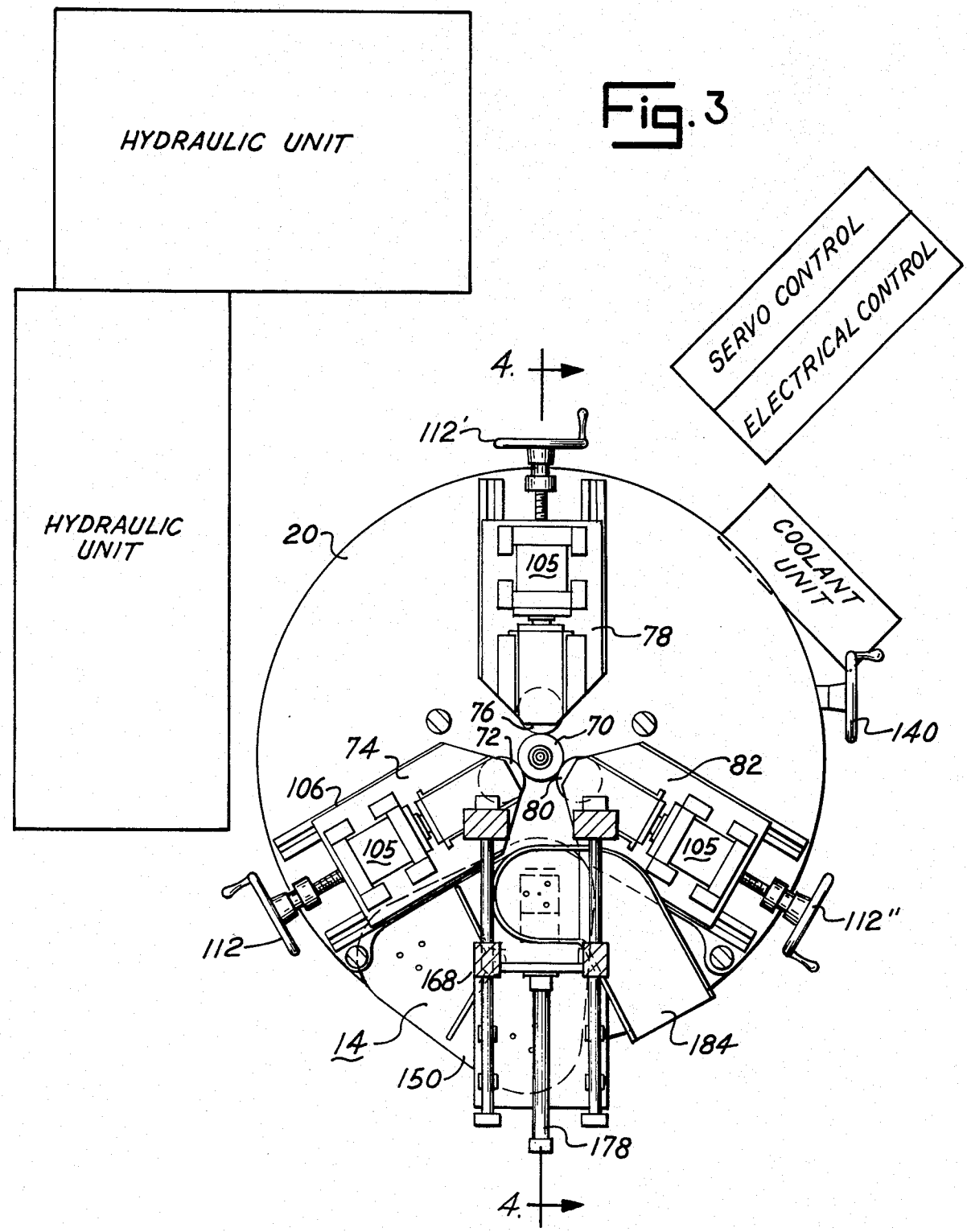
FIG. 3 is a horizontal cross sectional view of the machine, the section being taken on line 3 — 3 of FIG. 1.

Referring more specifically to the drawings, numeral 10 indicates generally the present sheave fabricating apparatus or machine in which a disc shaped blank is inserted in the machine and a blank slitting tool and flange spreading and reshaping tools move into the periphery of the blank to form a groove between two laterally extending flnages. This general type of process has been disclosed and claimed in U.S. Pat. No. 3,225,425. The process performed by the present machine involves the simultaneous operation of the slitting and spreading or rooter tools for forming the belt groove of the sheave, the operation of the two tools being performed in an overlapping relationship, with the spreading or rooting operation being so timed that the slitting tool does little or no flange spreading during its operation, this being performed essentially solely by the spreader or rooter tool.

Numeral 12 indicates the portion of the machine wherein the blank slitting, spreading and forming operations are performed, and numeral 14 indicates generally the loading mechanism. The machine has a base 20 and a head 22, the base having an axially movable spindle 24, and the head having an axially movable spindle 26 in direct axial alignment with spindle 24, the two spindles moving toward one another to clamp a blank for the sheave forming operation, and away from one another when the final article is to be discharged. Lower spindle 24 is rotatably mounted in bearings 28 and 29 in a cylinder 30, and is driven by a motor 32, preferably a hydraulic motor, and in the embodiment of the invention illustrated in the drawings, does not move axially during the normal operation of the machine, but only during the time that it is being adjusted. This latter operation and the mechanism for performing the operation will be described more fully hereinafter.

Figure 4:
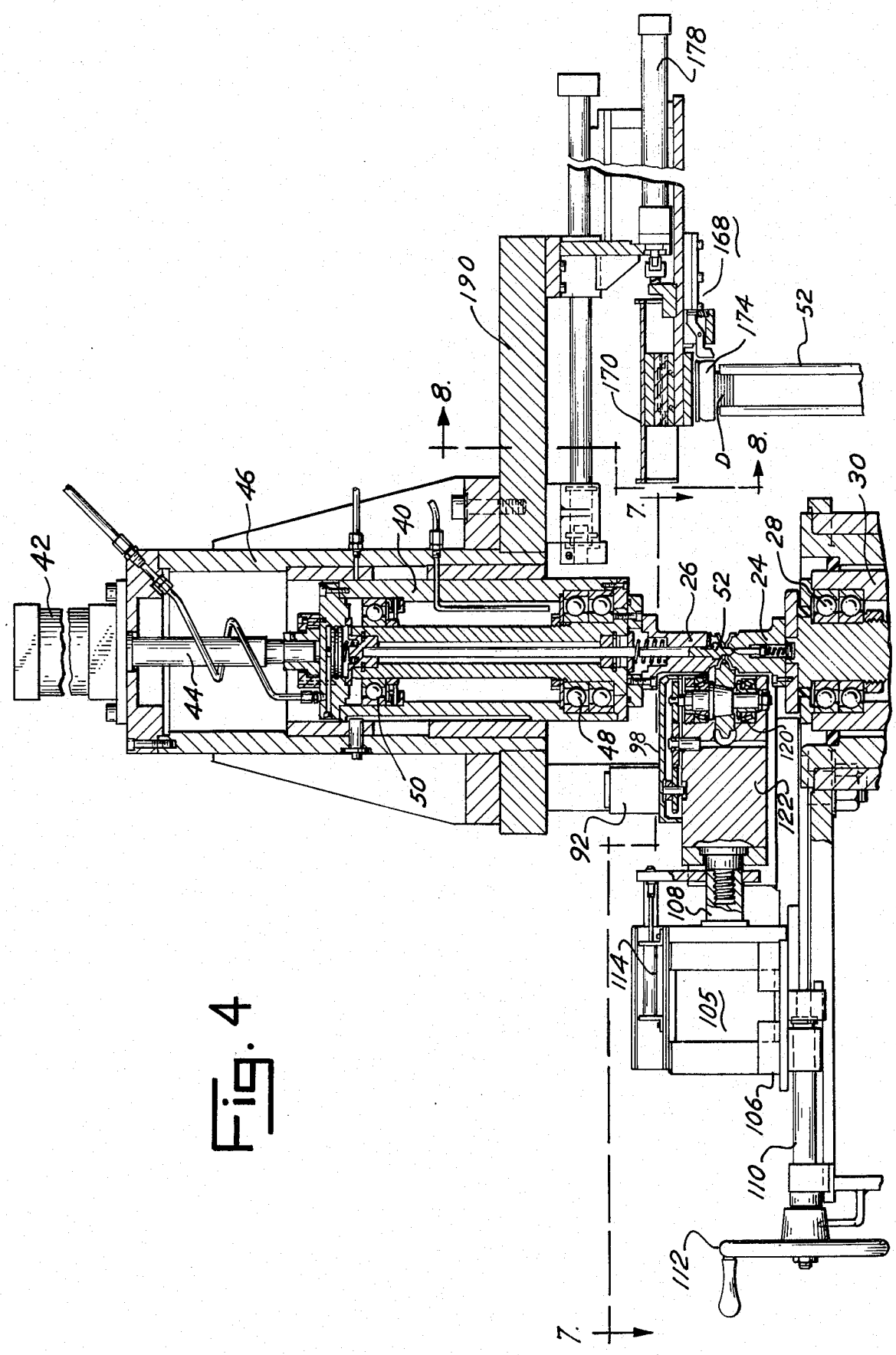
FIG. 4 is a vertical cross sectional view of the upper part of the machine, the section being taken on line 4 — 4 of FIG. 3.
Figure 5:
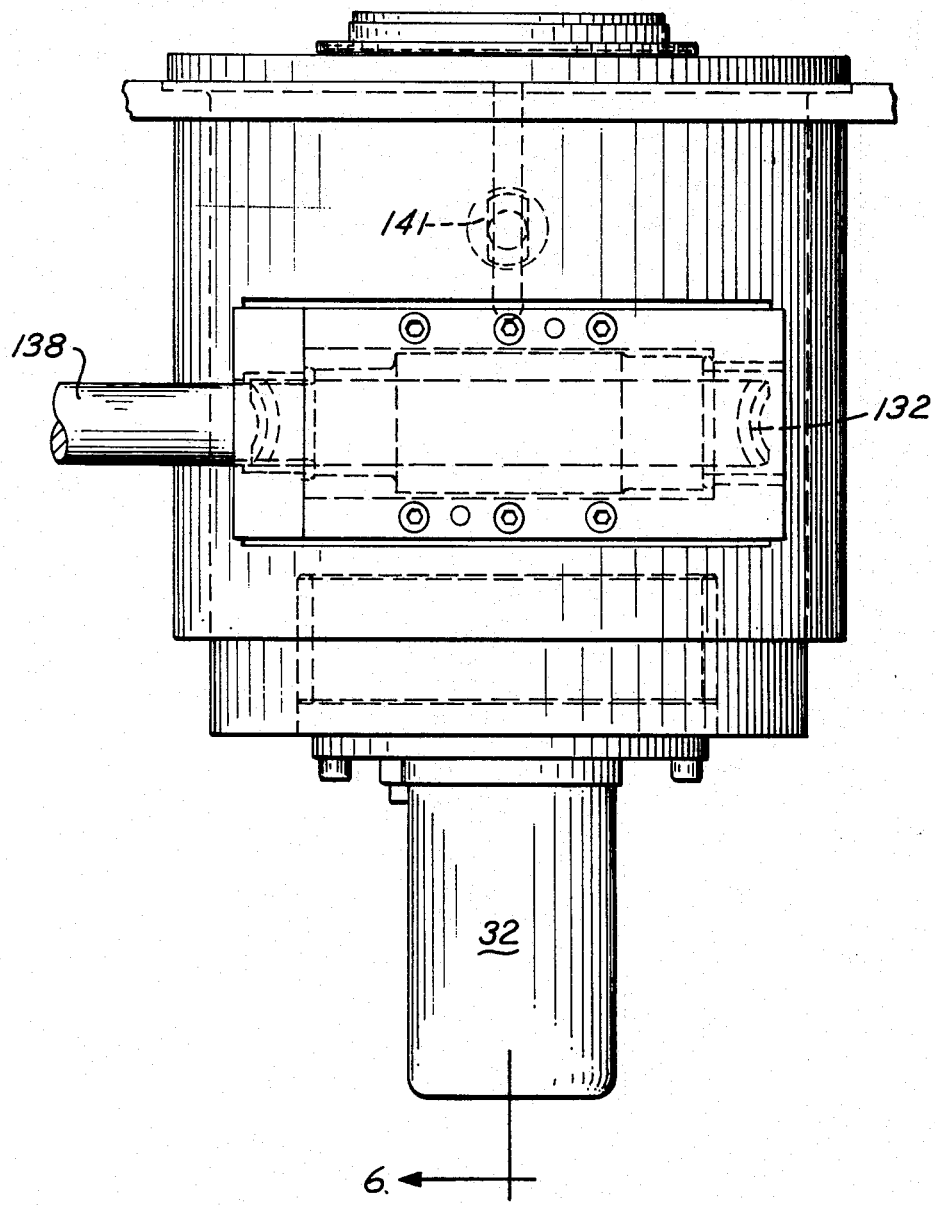
FIG. 5 is an enlarged elevational view of the lower portion of the machine.
Figure 6:
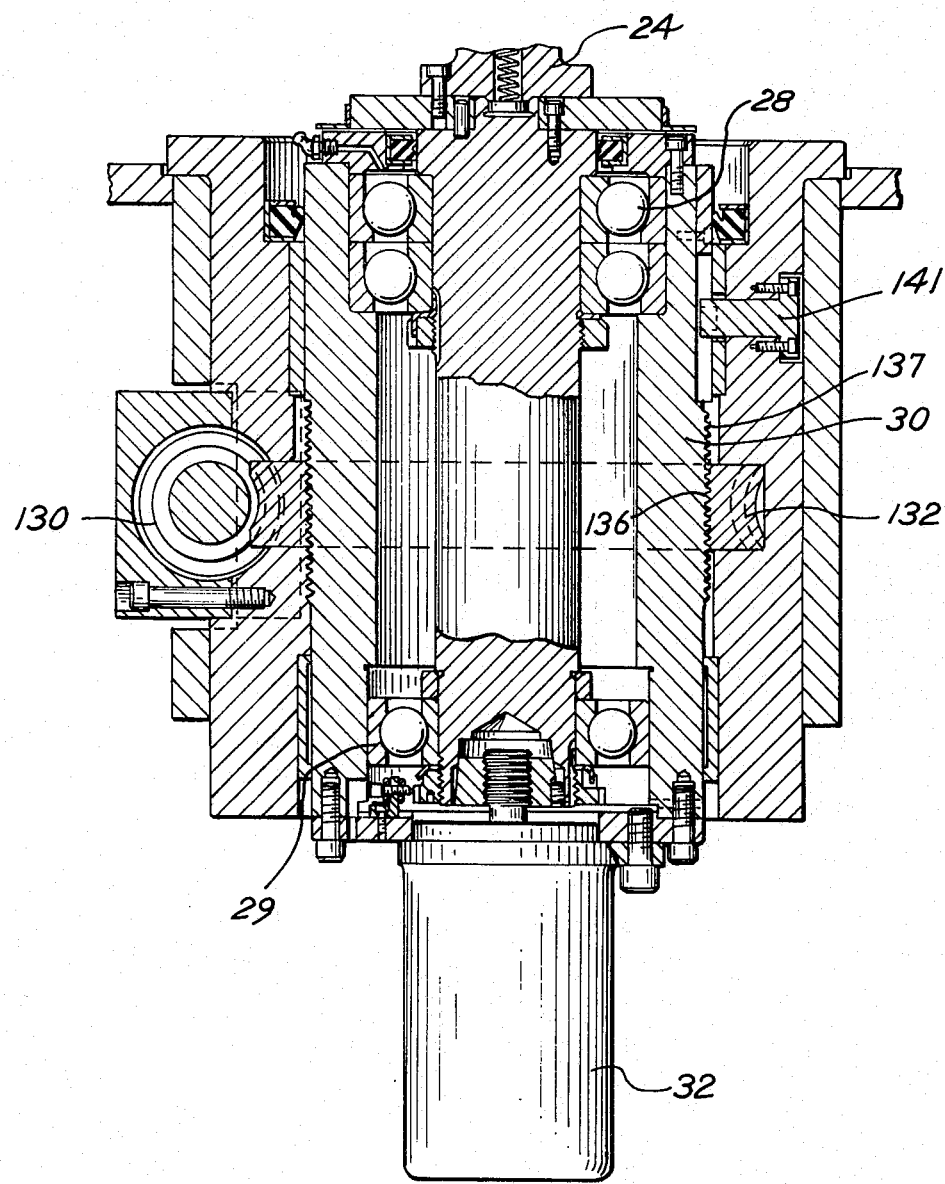
FIG. 6 is a vertical cross sectional view of the lower portion of the machine, the section being taken on line 6 — 6 of FIG. 5.

The upper spindle 26 is rotatably mounted in a cylinder 40, which is reciprocated by a hydraulic cylinder 42 through rod 44 connected to the upper end of cylinder 40, the latter cylinder sliding in housing 46 for lowering spindle 26 to the position shown in FIG. 4 where the sheave is produced. The spindle is mounted in cylinder 40 on lower bearings 48 and upper bearings 50, and is adapted to rotate in unison with spindle 24 when the adjacent ends are in blank clamping position. Since the blank is provided with a center hole, pin 52 extends downwardly from the lower end of spindle 26 into an axial hole in the upper end of spindle 24 to center the blank between the two spindles. Hydraulic cylinder 42 is mounted on the upper end of housing 46 and moves the upper spindle from the position shown in FIG. 1 to the position shown in FIG. 4.

The metal disc shaped blank 70 is initially slit by tool 72 mounted on a carriage 74, and the small flanges formed in the periphery of the blank by tool 72 are spread apart and the groove therebetween enlarged by spreader tool 76 mounted in carriage 78, and the flanges defining the groove are finally shaped or reformed by a tool 80 mounted in carriage 82. As mentioned hereinbefore, the operation performed by the three tools consists of first slitting a small groove in the periphery of the blank 70 by the use of tool 72 and thereafter spreading the flanges apart by the use of tool 76 which is so programmed to follow the inward movement of tool 72 that the two tools are operating simultaneously in an overlapping relationship, with the slitting tool starting and completing its operation first. The reshaping tool 80 may or may not be operated simultaneously with the other tools; however, it may be operated in an overlapping relationship such that it follows the operation of spreader tool 76 while the latter tool is still functioning.

Since the carriage and the mechanism for operating the three tools 72, 76 and 80 are essentially the same, only one will be described in detail herein. Each tool is driven by a motor, preferably a hydraulic motor 90, through gears 92, 94 and 96 mounted in the upper part of the carriage under housing 98. The carriage is disposed in a track 100 formed by parallel members 102 and 104, and is moved inwardly into operating position and withdrawn from operating position by a hydraulic cylinder 105 mounted on bed 106, the cylinder operating through rod 108 which is connected to the carriages. Bed 106 is adjusted inwardly and outwardly by a screw mechanism 110 to hand wheel 112 which places the cylinder in the bed in position for operating the tool inwardly to the desired depth and outwardly to its fully retracted position. A potentiometer 114 senses the movement of the carriage and controls the movement of the tool through the electrical control system for the machine. All three tools 72, 76 and 80 are rotated in the direction opposite the direction of the spindle so that the periphery of the tools and the blank are moving substantially at the same rate in the same direction when contact between the tools and the blank is made, thereby reducing wear on the tools and substantially increasing the life thereof. Each tool is journaled in bearings 120 in block 122 of the respective carriage, and is not adjusted vertically either in the setting up of the machine or in the operation thereof.

Since it is normally important to have the tools on the center line of the disc shaped blank, and since there may be variations in thickness between the blanks of different sizes of sheaves, a mechanism is provided for adjusting the spindles 24 and 26 upwardly and downwardly, the mechanism consisting of a worm 130 for rotating gear 132, which is in the form of a ring, having threads 136 on the internal surface, which intermesh with the threads 137 on the external surface of cylinder 30, so that rotation of the worm in one direction or the other raises or lowers cylinder 30, and hence raises or lowers spindle 24, and thus adjusts the blank relative to the three tools. The worm is rotated to raise or lower spindle 24 by shaft 138 and hand wheel 140. The cylinder is prevented from rotating by pin 141 when gear 132 is rotated. Rotating the hand wheel a partial revolution, one way or the other, will normally adjust the lower spindle to the proper height for centering the blank with respect to the three tools. The upper spindle 26 is positioned merely by seating on top of the blank which is supported on the upper end of lower spindle 24 in preparation of the groove forming operation.

The load mechanism 14 includes a turret 150 having indexing table 151 with stations for three stacks of disc shaped blanks, the station being indicated by numerals 152, 154 and 156. Each station includes three vertical bars 158, 160 and 162 extending upwardly through radially extending slots in the table which permit the bars to be adjusted outwardly and inwardly to accommodate blanks of different diameters. The feeding is performed from a single station at any one time, the mechanism for feeding the blanks to the machine being best seen in FIGS. 8 through 12, 14 and 16. The blanks are supported in a space between the vertical bars by a plunger or plate 164 so that the stack of blanks projects above the vertical rods.

A feed mechanism 168 for transferring blanks to the spindle consists of a head 170 having a tray 172 on the upper side and a magnet 174 on the lower side thereof. The head moves on a track 176 positioned directly above one of the stations to a position between the two spindles 24 and 26, the head being reciprocated between the two positions by a hydraulic cylinder 178 connected to the head by a rod 180. Magnet 174 is energized when the head is in the position shown in FIG. 10 and lifts one blank from the upper end of the stack, and when the cylinder is operated, the head is moved with the energized magnet carrying the blank into the position between the spindles. At this position, the magnet is de-energized, depositing the blank on the upper end of spindle 24. Simultaneously with this latter operation, a magnet in spindle 26, which has held the finished sheave S on the lower end of spindle 26 is de-energized, permitting the sheave to drop onto tray 172. The head is then retracted, carrying the sheave thereon to the retracted position. The tray is pivoted on hinge 182, and as the head approaches its fully retracted position, a cam 184 tilts the tray from the position illustrated in FIG. 11 to the position illustrated in FIG. 12, thereby permitting the sheave S to slide off the tray onto a chute 185 which delivers the sheave to a receptacle, conveyor or other receiving means. The head is supported by rods 186 and 188, which in turn are supported on frame 190 mounted above the feeding mechanism.

Figure 16:
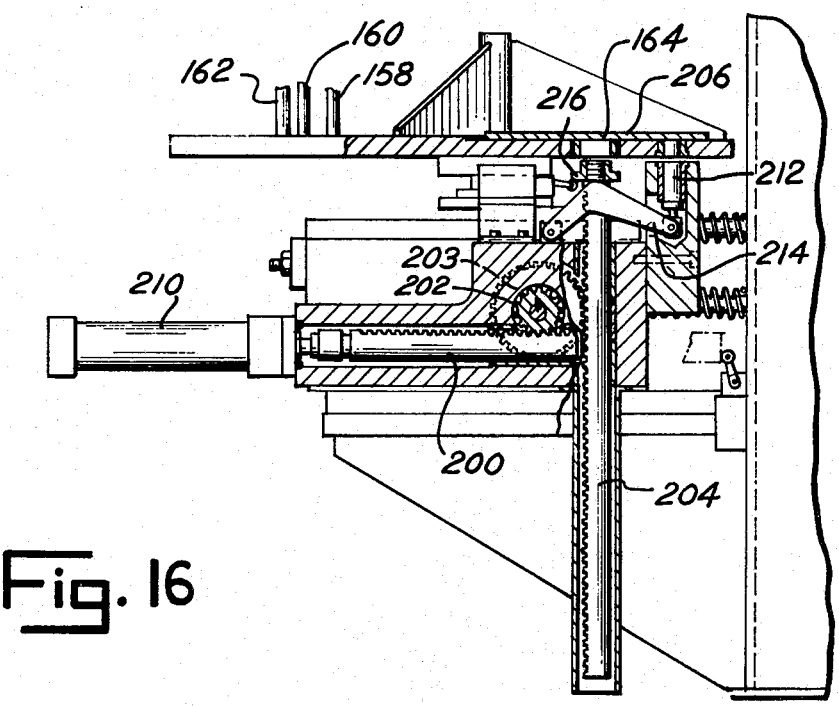
FIG. 16 is a cross sectional view taken on line 16 — 16 of FIG. 13.

The stack of blanks is elevated by a mechanism, illustrated best in FIGS. 14 and 16, which consists of a shaft or rack 200, pinions 202 and 203, and a second rack 204. The latter rack is in vertical position and moves upwardly to lift platform 206 on which the stack of blanks rests. Each time a blank is to be removed, a hydraulic cylinder 210 is energized which moves rack 200 to the right as viewed in FIG. 16, causing pinions 202 and 203 to rotate, and thereby causing rack 204 to move upwardly, placing the top blank against the underside of the magnet. The cylinder then operates to retract the vertical rack by a partial stroke, permitting the top blank to be freely moved by the magnet into the machine. When all of the blanks have been removed from a stack, a limit switch operates the cylinder to fully retract rack 204 and plate 206 downwardly to a position at which the turret can be rotated without interference therefrom. The retraction of the rack downwardly withdraws a locking pin 212 from the turret top so that the top can be rotated, as will be more fully explained hereinafter. The locking pin is moved downwardly by arm 214 connected to the lower end of the pin and engaged by an abutment 216 on the upper end of rack 204.

Figure 7:
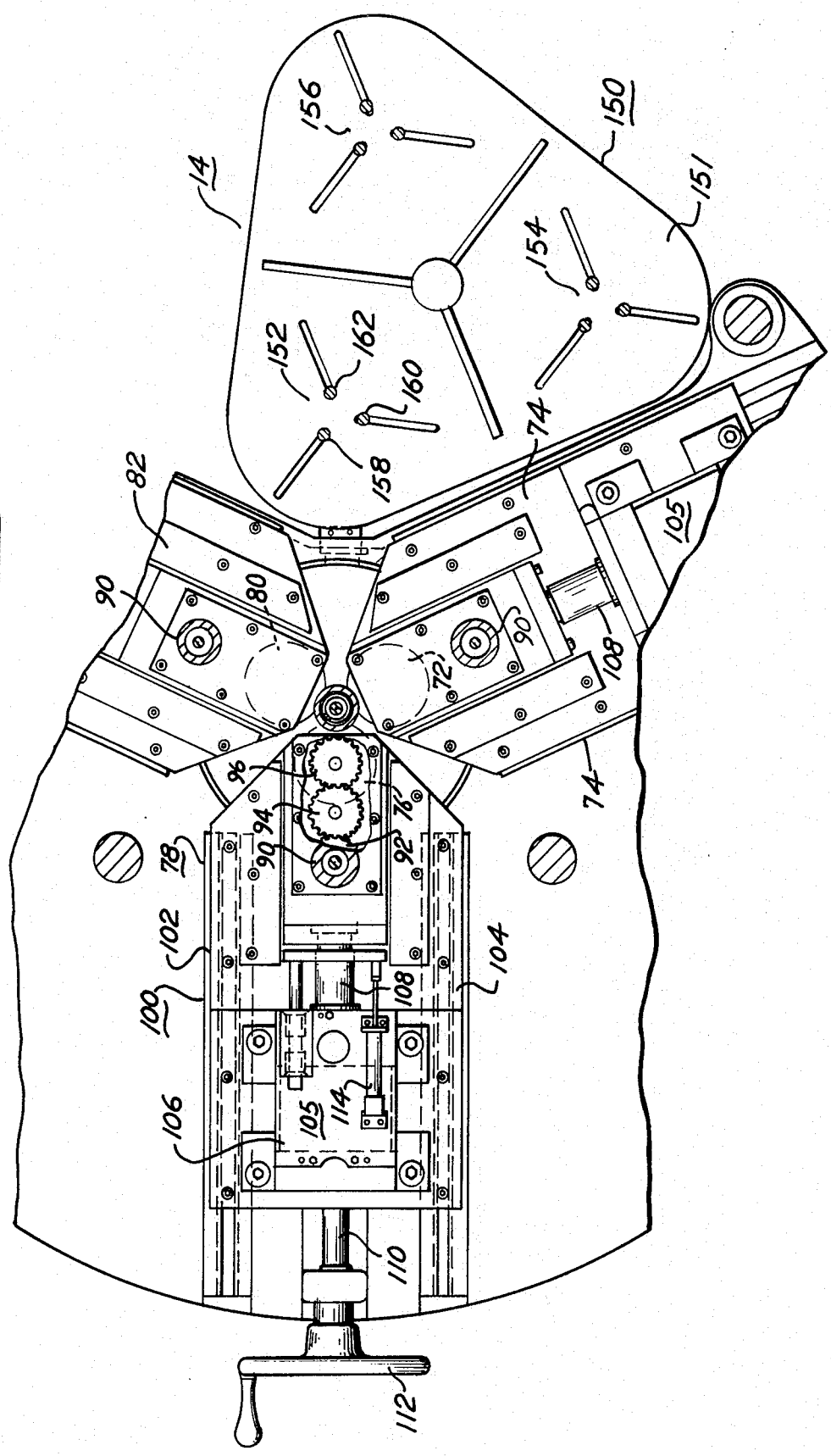
FIG. 7 is a horizontal cross sectional view of the machine, the section being taken on line 7 — 7 of FIG. 4.
Figure 8:
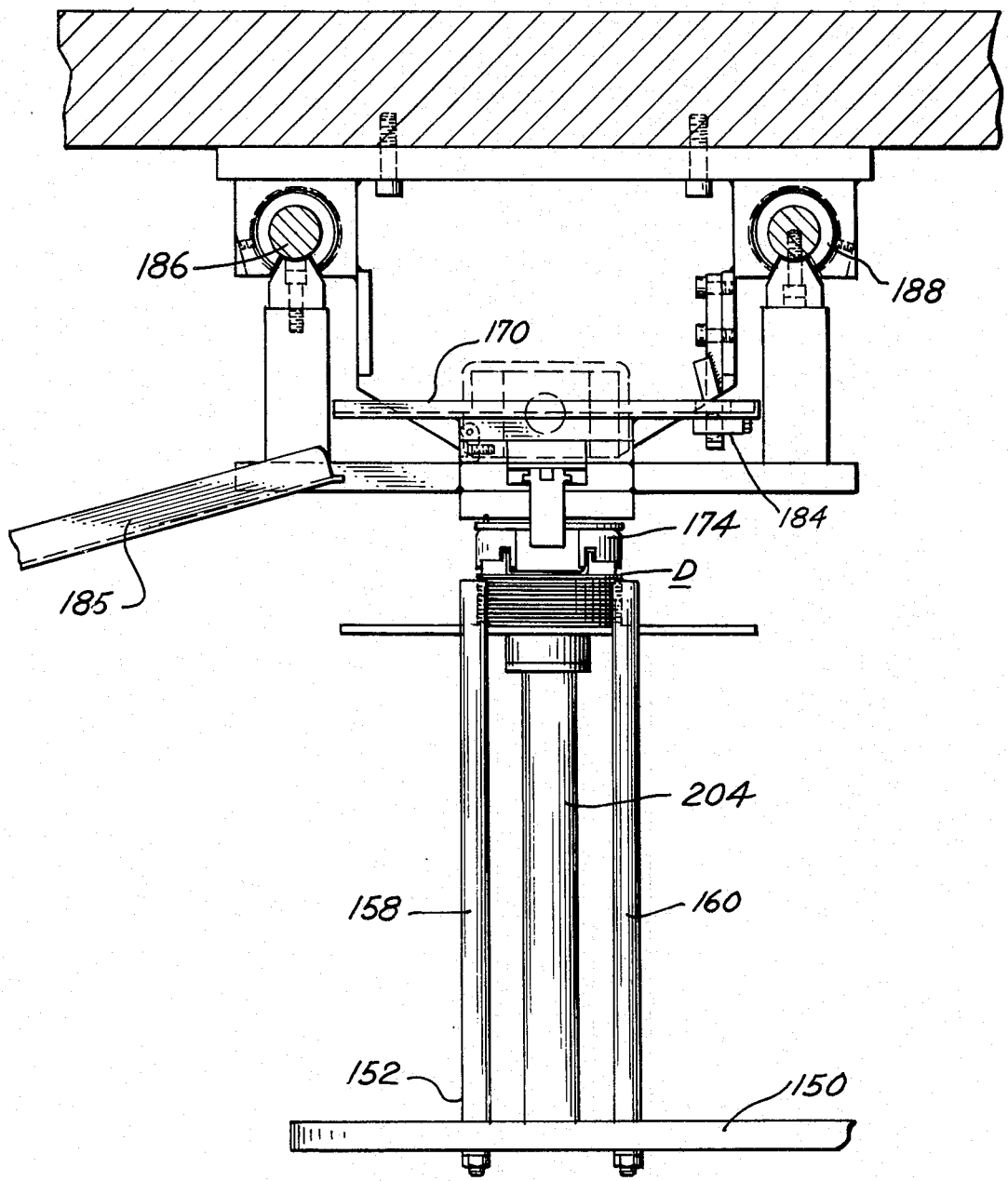
FIG. 8 is a vertical cross sectional view of a portion of the machine, the section being taken on line 8 — 8 of FIG. 4.
Figure 9:
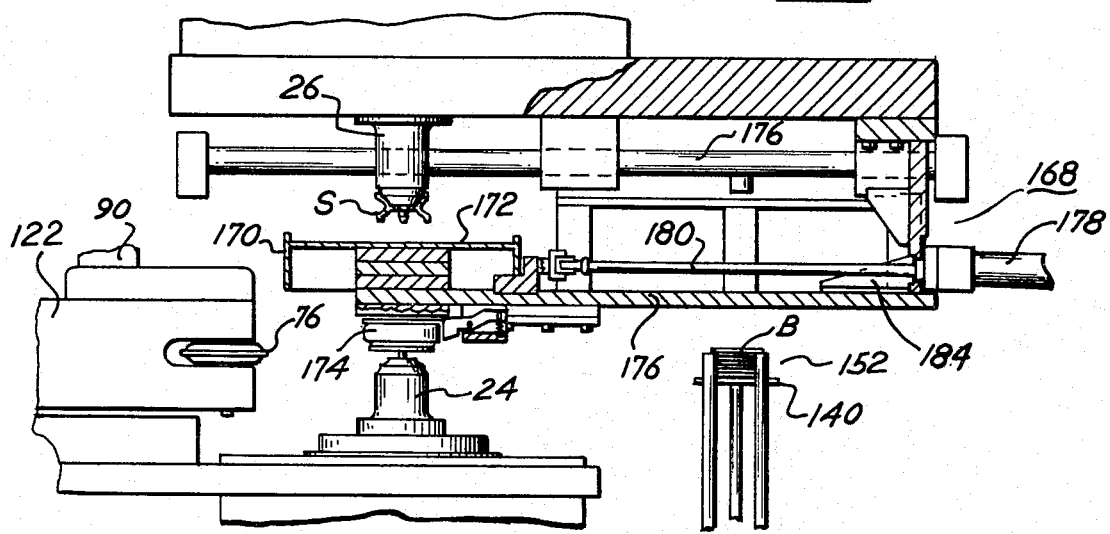
FIGS. 9 and 10 are partial cross sectional views of the machine, similar to that shown in FIG. 4, illustrating the manner in which the blank loading and sheave unloading operations are performed.
Figure 10:
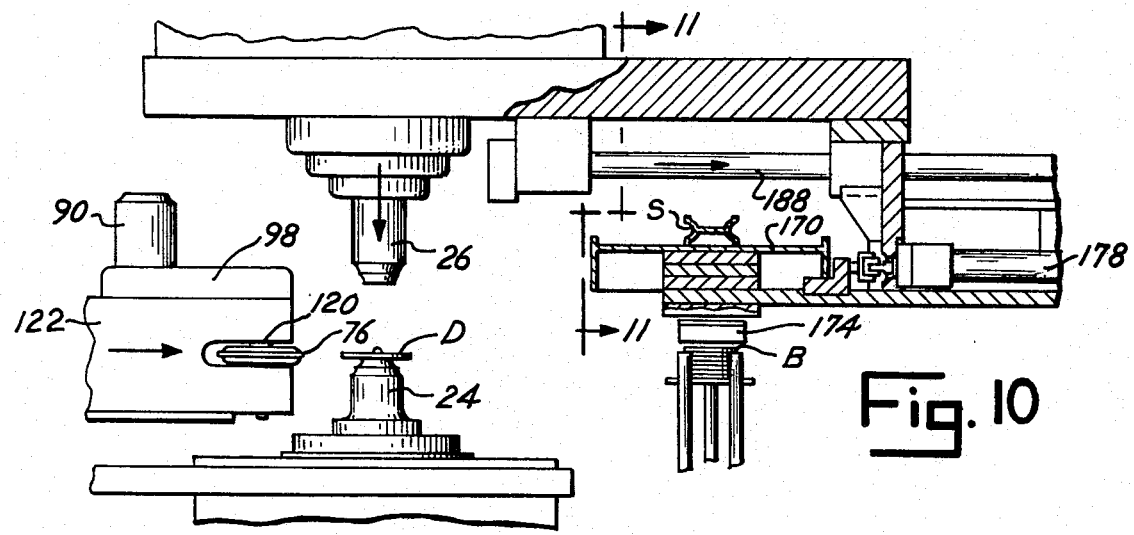
Figure 11:
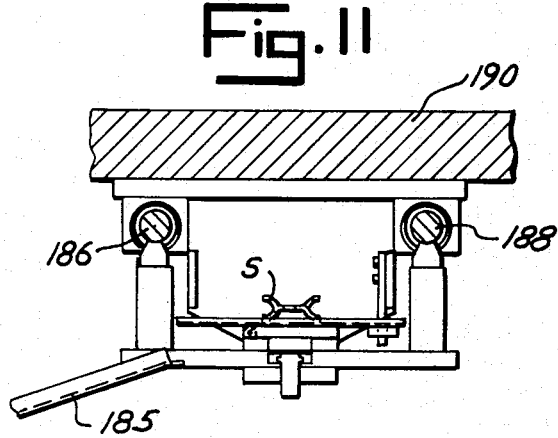
FIG. 11 is a vertical cross sectional view through a portion of the loading mechanism, the section being taken on line 11 — 11 of FIG. 10.
Figure 12:
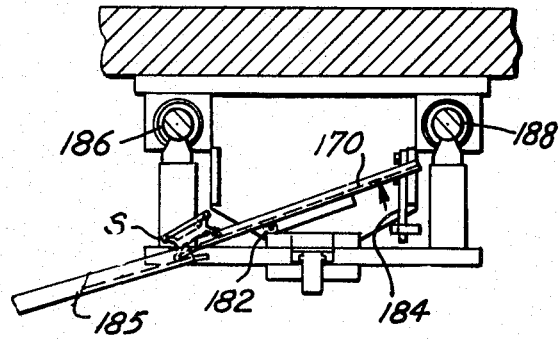
FIG. 12 is a vertical cross sectional view through a portion of the loading machine on the same plane as FIG. 11, showing the mechanism in a different operating position.
Figure 15:
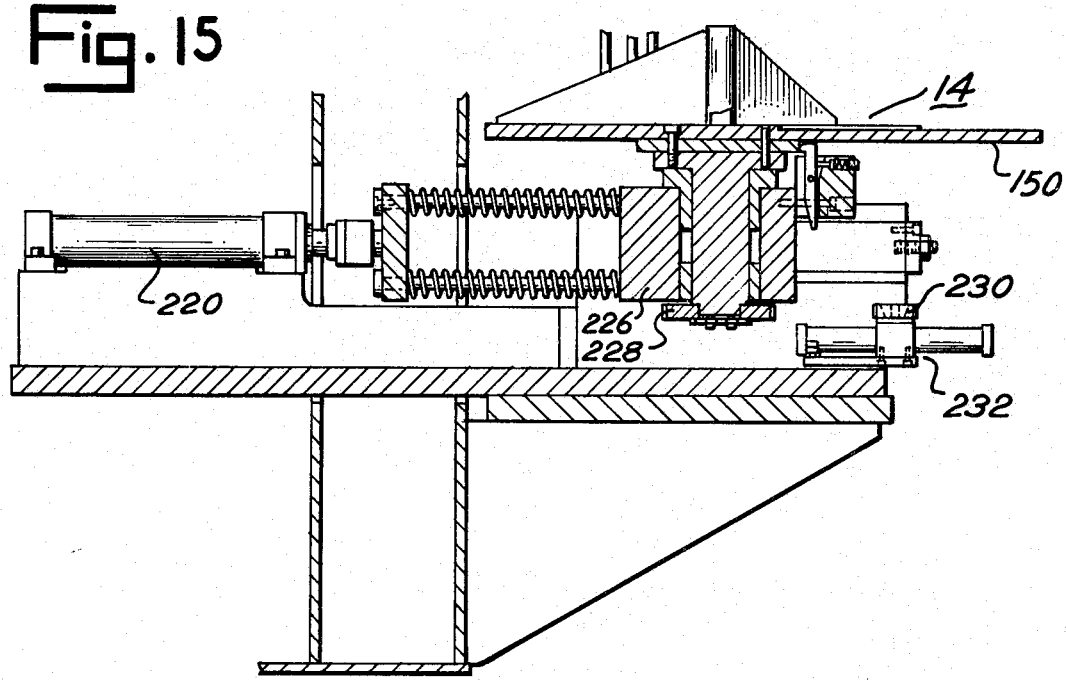
FIG. 15 is a vertical cross sectional view of the loading mechanism, the view being taken on line 15 — 15 of FIG. 13.

When the blanks have all been removed from one station, the turret is rotated automatically through the use of a hydraulic cylinder 220, which moves the turret mechanism outwardly from the machine on tracks 222 and 224, and as the mechanism moves outwardly, body 226, on which the turret top is rotatably mounted, causes gear 228 to move outwardly into engagement with gear 230. When the two gears are intermeshed, a hydraulic mechanism 232 operates to index the turret one third of a revolution to place station 154, having thereon a stack of blanks, into the position previously occupied by station 152 in FIG. 7, for example. After the turret top has been indexed, cylinder 220 retracts the table inwardly to position magnet 174 of the feeding mechanism over the stack. Cylinder 210 is operated to cause rack 204 to lift the new stack of blanks to the position at which magnet 174 of the feeding mechanism can remove the top blank therefrom and place it on spindle 24.

In the operation of the sheave fabricating machine in combination with the present loading and unloading apparatus, one station, for example station 152, of the loading mechanism is loaded with disc shaped blanks and indexed to the position for feeding the machine. The rods are adjusted so that only the top disc shaped blank extends above the top of the rods. When the machine is started, magnet 174 is energized and lifts the top disc D, which is moved along with the magnet as the feeder is advanced, from the position illustrated in FIG. 10 to the position illustrated in FIG. 9. When the blank is over spindle 24, the magnet deenergizes, thus depositing the blank on the top of the spindle. The feeder then retracts and the upper spindle is lowered by the operation of hydraulic cylinder 42 into contact with the blank resting on the lower spindle. With the two spindles being rotated by motor 32, the slitter tool, driven by hydraulic motor 90 through gears 92, 94 and 96, contacts the periphery of the rotating blank and forms a slight groove in the periphery thereof. As the slitting tool 72 proceeds with the operation, the spreading or rooting tool then moves in and presses the flanges outwardly so that the slitting tool only contacts the blank near the peripheral cutting edge thereof to separate the metal which is then forced outwardly by the spreading tool driven by motor and gears similar to those driving the slitter too. The two tools 72 and 76 advance inwardly simultaneously in overlapping relationship, while being driven by their respective motors, until the full groove is formed and the flanges are spread laterally. After this operation has been completed, the forming tool 80 is advanced inwardly, while being driven by a motor and gears similar to those driving the slitter tool, and forms the flanges into their final design, normally with laterally extending beads and a rounded bottom between the two flanges. The tools are advanced and retracted by hydraulic cylinders 105 in accordance with the previously described sequence and program. The forming tool 80 may be operated simultaneously with, but in a delayed relationship to, the operation of tools 72 and 76. The adjustment of the tools to provide the proper depth for any particular diameter pulley is controlled by the hand wheels 112, 112' and 112" for the slitter, spreader and forming tools, respectively. The position of these tools with respect to the center line of the blank is adjusted by rotating wheel 140 one way or another to adjust cylinder 30 upwardly or downwardly through the rotation of worm 130 and gear 132.

After the sheave has been formed in the foregoing manner, spindle 26, which contains an electromagnet operable in conjunction therewith, is withdrawn upwardly, carrying the completed sheave. The feeder is then moved inwardly by hydraulic cylinder 178, again carrying another blank into the forming position between the spindles. The magnet in spindle 26 then releases the formed sheave, which drops onto tray 172. The feeder is then retracted to its initial position and is tilted on hinge 182 by cam 184, thus causing the sheave to slide from the tray onto chute 185. With a new blank having been deposited on the lower spindle 24, the upper spindle 26 is seated thereon and the operation of forming the groove in the periphery of the blank is commenced as the two spindles rotate in unison. The tools are rotated at substantially the same peripheral speed as the blanks as they contact the blank. It should be noted that the spreading or rooting tool is spaced from the slitting tool 120 degrees and, when it is operating and is applying a force, it at least in part provides a counter-force to the force of the slitting tool. The forming tool is spaced 120 degrees from the other two tools and when all three tools are operated simultaneously, the forces are essentially balanced on the blank and spindles. The spreading or rooting tool may be positioned diametrically opposite the slitting tool for counteracting the applied forces of the slitting tool. The same effect is obtained by placing the tools in the position illustrated in the drawings, but to a lesser degree, when only two of the tools are operating simultaneously.

The stack of blanks on the loading mechanism is constantly advanced upwardly by cylinder 210 acting through rack 200, gears 202 and 203, and rack 204. When the stack has been depleted, racks 200 and 204 are withdrawn to their fully retracted position and cylinder 220 operates to move the turret outwardly to engage gears 228 and 230 so that the hydraulic cylinder mechanism 232 can rotate the plate to the next station which has been previously loaded with a stack of disc shaped blanks. After the blanks have been moved into position, the operation of the loading, feeding and sheave forming mechanism is performed in the same manner as previously described herein.

While only one embodiment of the present loading and unloading apparatus has been described in detail herein, various changes and modifications may be made without departing from the scope of the invention.

I claim:

1. A loading apparatus for use with a sheave fabricating machine having a spindle mechanism for holding a disc shaped blank between two relatively movable parts: comprising a turret means rotatable on a vertical axis, a plurality of stations for holding stacks of disc shaped blanks on said turret means, an indexing means for placing one of said stations containing a stack of blanks to a position to be fed into the spindle mechanism, a blank feeder mechanism having an arm and a head on said arm movable between said one station and said spindle mechanism, a means on said head for carrying a blank from said one station to said spindle mechanism, and a means on said head for withdrawing a sheave from the spindle mechanism, including a tray, a pivot means for said tray, and a means for pivoting said tray to one side to discharge the completed sheaves.

2. A loading apparatus for use with a sheave fabricating machine as defined in claim 1 in which said head includes a magnet for carrying a blank between said one station and said spindle mechanism.

3. A loading apparatus for use with a sheave fabricating machine as defined in claim 1 in which said turret means includes a table and each of said plurality of stations includes a plurality of vertically positioned rods supported by said table for retaining a stack of blanks in vertical position.

4. A loading apparatus for use with a sheave fabricating machine as defined in claim 1 in which a means is provided in said turret means for elevating the stack of blanks at said one station to the position for said carrying means on said head to deliver a blank to the spindle mechanism.

5. A loading apparatus for use with a sheave fabricating machine as defined in claim 1 in which said blank carrying means includes a magnet and a means is included in said turret means for elevating the stack of blanks at said one station to the position at which said magnet can engage and remove the uppermost blank from said stack.

6. A loading apparatus for use with a sheave fabricating machine as defined in claim 1 in which the mechanism for rotating the turret means includes a hydraulic cylinder for moving the turret means outwardly from the machine and a second means rotates said turret means to place another station containing a stack of blanks in place for feeding the blanks into the machine.

* * * * *